United States Patent
Zhang et al.

(10) Patent No.: US 6,952,226 B2
(45) Date of Patent: Oct. 4, 2005

(54) STRAY-INSENSITIVE, LEAKAGE-INDEPENDENT IMAGE SENSING WITH REDUCED SENSITIVITY TO DEVICE MISMATCH AND PARASITIC ROUTING CAPACITANCE

(75) Inventors: Zhengwei Zhang, Plano, TX (US); Zhiliang Julian Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 930 days.

(21) Appl. No.: 09/748,799

(22) Filed: Dec. 22, 2000

(65) Prior Publication Data

US 2002/0113883 A1 Aug. 22, 2002

(51) Int. Cl.[7] .......................... H04N 3/14; H04N 5/335; H01L 31/062; H01L 31/113
(52) U.S. Cl. ..................... 348/294; 348/308; 257/290
(58) Field of Search ................................ 348/241, 394, 348/302, 308; 250/208.1, 214 A; 257/288, 290–294; 327/91–96; 330/9

(56) References Cited

U.S. PATENT DOCUMENTS

| | | | |
|---|---|---|---|
| 5,534,815 A | * | 7/1996 | Badyal ........................ 327/437 |
| 5,969,758 A | * | 10/1999 | Sauer et al. .................. 348/241 |
| 5,978,025 A | * | 11/1999 | Tomasini et al. ............ 348/302 |
| 6,002,432 A | * | 12/1999 | Merrill et al. ............... 348/241 |
| 6,128,039 A | * | 10/2000 | Chen et al. .................. 348/294 |
| 6,248,991 B1 | * | 6/2001 | Chen et al. ................ 250/208.1 |
| 6,320,616 B1 | * | 11/2001 | Sauer .......................... 348/241 |
| 6,423,958 B1 | * | 7/2002 | Okamoto et al. ......... 250/208.1 |
| 6,535,247 B1 | * | 3/2003 | Kozlowski et al. ......... 348/241 |
| 6,618,083 B1 | * | 9/2003 | Chen et al. .................. 348/243 |
| 6,665,013 B1 | * | 12/2003 | Fossum et al. ............. 348/308 |
| 6,697,108 B1 | * | 2/2004 | Chen et al. .................. 348/241 |

\* cited by examiner

*Primary Examiner*—Tuan Ho
*Assistant Examiner*—Kelly L. Jerabek
(74) *Attorney, Agent, or Firm*—J. Dennis Moore; W. James Brady, III; Frederick J. Telecky, Jr.

(57) ABSTRACT

A single capacitor (C) can be used for both readout and noise reduction in an imaging sensor. This dual-purpose use of the single capacitor is facilitated by a switching arrangement ($\Phi 1$–$\Phi 5$) which connects the capacitor to a low impedance node (n7, n41) during charge storage. The low impedance node is also used to drive a column readout line ($V_{out}$).

11 Claims, 3 Drawing Sheets

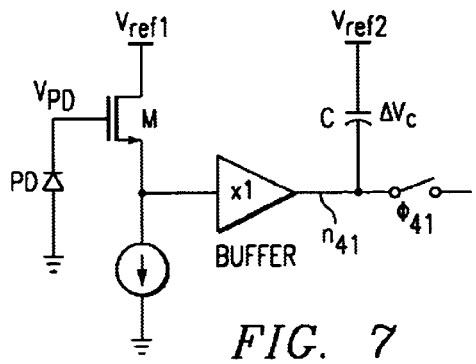
FIG. 7
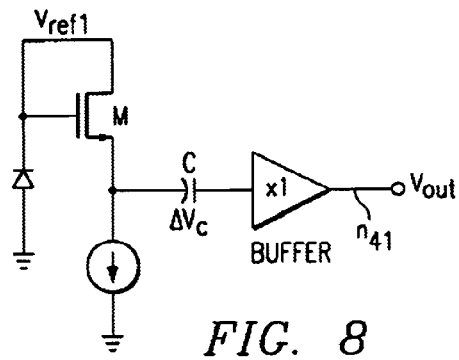
FIG. 8
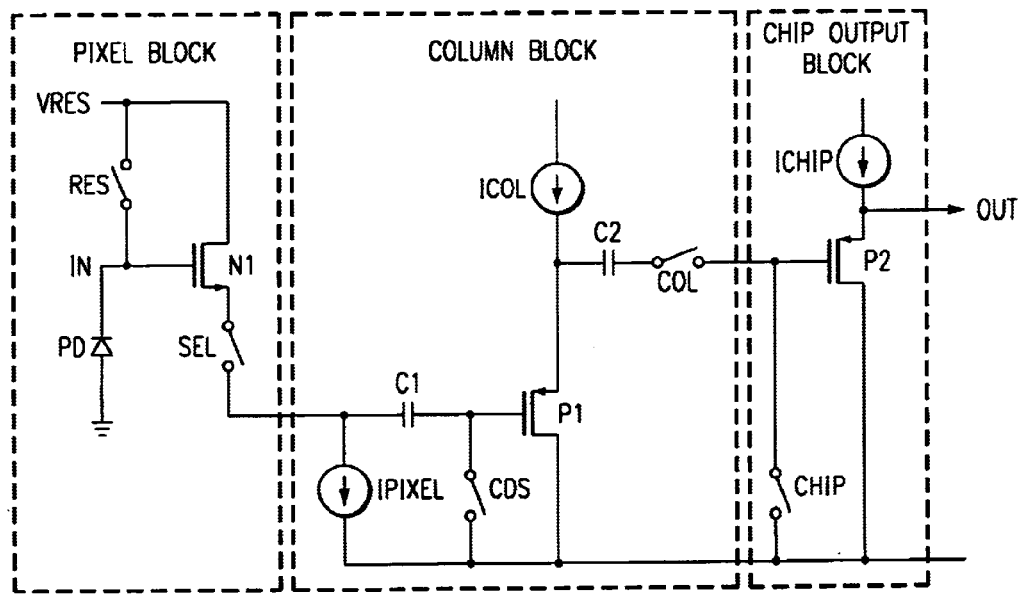
FIG. 9 (PRIOR ART)
|  | RES | SEL | CDS | COL | CHIP |
|---|---|---|---|---|---|
| INTEGRATION PERIOD | OPEN | OPEN | X | X | X |
| READOUT STEP 1 | OPEN | OPEN | CLOSED | CLOSED | CLOSED |
| READOUT STEP 2 | OPEN | CLOSED | CLOSED | OPEN | CLOSED |
| READOUT STEP 3 | OPEN | CLOSED | OPEN | OPEN | OPEN |
| READOUT STEP 4 | CLOSED | CLOSED | OPEN | CLOSED | OPEN |
| READOUT STEP 5 | OPEN | OPEN | OPEN | OPEN | CLOSED |
| READY FOR NEXT PIXEL READOUT |  |  |  |  |  |
FIG. 10 (PRIOR ART)

STRAY-INSENSITIVE, LEAKAGE-INDEPENDENT IMAGE SENSING WITH REDUCED SENSITIVITY TO DEVICE MISMATCH AND PARASITIC ROUTING CAPACITANCE

FIELD OF THE INVENTION

The invention relates generally to electronic circuitry and its operation and, more particularly, to the structure, control and operation of CMOS image sensing circuitry.

BACKGROUND OF THE INVENTION

CMOS image sensors are emerging as a viable alternative to CCD sensors due to the low power consumption and high integration capability of CMOS circuitry. However, CMOS imaging sensors also have various problems. One example is the so-called fixed-pattern-noise (FPN) caused by device mismatches and/or process nonuniformities. A mismatch occurs at each pixel site, and at each column read-out.

An example of a known CMOS imaging sensor is shown in FIG. 9. The key blocks are: Pixel Block; Column Block; and Chip Output Block. The pixel Block (one for each pixel) includes the following: Photodiode PD; NMOS Transistor N1; and Switches RES and SEL. The Column Block (one for each column of Pixels) includes the following: Capacitors C1 and C2; PMOS Transistor P1; Switches CDS and COL; and Current sources IPIXEL and ICOL. The Chip Output Block (one for the whole chip) includes the following: PMOS Transistor P2; Switch CHIP; and Current Source ICHIP.

The operation of the Pixel Block is as follows: Node IN is connected to switch RES, the cathode of photodiode PD, and the gate of NMOS transistor N1. Initially switch RES is closed and the voltage on node IN is VRES. Then switch RES is opened. There will be a finite charge on node IN dependent on the voltage VRES, the capacitance of photodiode PD, and the gate capacitance of NMOS transistor N1. The photodiode current causes the charge on node IN to be discharged and the voltage on node IN decreases. Generally imagers have a fixed integration time or period. The voltage on node IN at the end of the integration period is referred to herein as VPD.

The voltage on node IN is read out using NMOS transistor N1 and Switch SEL, the Column Block circuit, and the Chip Output Block circuit.

FIG. 10 summarizes the position of the switches during the Integration Period and the Pixel Readout, which enables the FPN to be suppressed.

During the Integration Period, RES and SEL are open. During the Pixel Readout, the following occurs.

Readout Step 1: RES and SEL are open, CDS, COL, and CHIP are closed to reset the Column and Chip Blocks. The voltage across C1 will be zero. The voltage across C2 is VP1gs, which is the gate to source voltage of PMOS transistor P1.

Readout Step 2: SEL is closed and COL is opened. The voltage across C1 becomes VPD−VN1gs (VN1gs=gate to source voltage of NMOS transistor N1). The voltage across C2 remains VP1gs.

Readout Step 3: CDS and CHIP are opened. The voltage across C1 remains VPD−VN1gs. The voltage across C2 remains VP1gs.

Readout Step 4: RES and COL are closed. The source voltage of N1 becomes VRES−VN1gs. The voltage across C1 remains VPD−VN1gs. Thus the gate voltage of P1 becomes (VRES−VN1gs)−(VPD−VN1gs)=VRES−VPD. The source voltage of P1 becomes (VRES−VPD)−VP1gs. The voltage across C2 remains VP1gs. Thus the gate voltage of P2 becomes (VRES−VPD)−VP1gs+VP1gs=VRES−VPD. The readout voltage OUT is VRES−VPD+VP2gs where VP2gs is the gate to source voltage of PMOS transistor P2. PMOS transistor P2 is a common device used for the readout of all pixels.

Both VN1gs and VP1gs terms are canceled in this Sequential Correlated Double Sampling Technique. The N1 and P1 Vt terms, which are embedded in the VN1gs and VP1gs, are also canceled. Thus the effect of CMOS Vt mis-matches are suppressed with the above technique and the Fixed Pattern Noise is greatly reduced.

Readout Step 5: CHIP is closed. The readout voltage OUT equals VP2gs. The rest of the switches are opened. The pixel has been reset for the next Integration Period. The system is ready for the next pixel readout.

The above description is a readout operation for one pixel. During the Integration Period for one pixel, the Column Block and Chip Output Blocks are being used for Readout of other pixels.

Some problems with the CMOS imaging sensor of FIG. 9 include the disadvantageous effect of parasitic routing capacitance caused by capacitors C2 (thousands of them in a complete pixel array) driving the transistor P2, and the fact that the capacitors are typically poly/n-well capacitors which disadvantageously tend to be stray-sensitive and also suffer from a leakage problem.

It is desirable in view of the foregoing to provide for CMOS image sensing that avoids the aforementioned problems associated with known CMOS imaging sensors.

According to the invention, a single capacitor can be used for both readout and reduction of device mismatches. Such dual-purpose use of a single capacitor is facilitated by a switching arrangement. The switching arrangement connects the capacitor to a low impedance node during charge storage, thereby advantageously providing the stored charge with a stray-insensitive, leakage independent characteristic. Also, the column readout line is driven by the low impedance node, thereby advantageously reducing parasitic routing capacitance.

BRIEF DESCRIPTION OF DRAWINGS

FIG. 7 illustrates a sampling state of the imaging sensor of FIG. 5.

FIG. 8 illustrates a read-out state of the imaging sensor of FIG. 5.

FIG. 9 and 10 illustrate a known CMOS imaging sensor arrangement.

DETAILED DESCRIPTION

Figure 1:
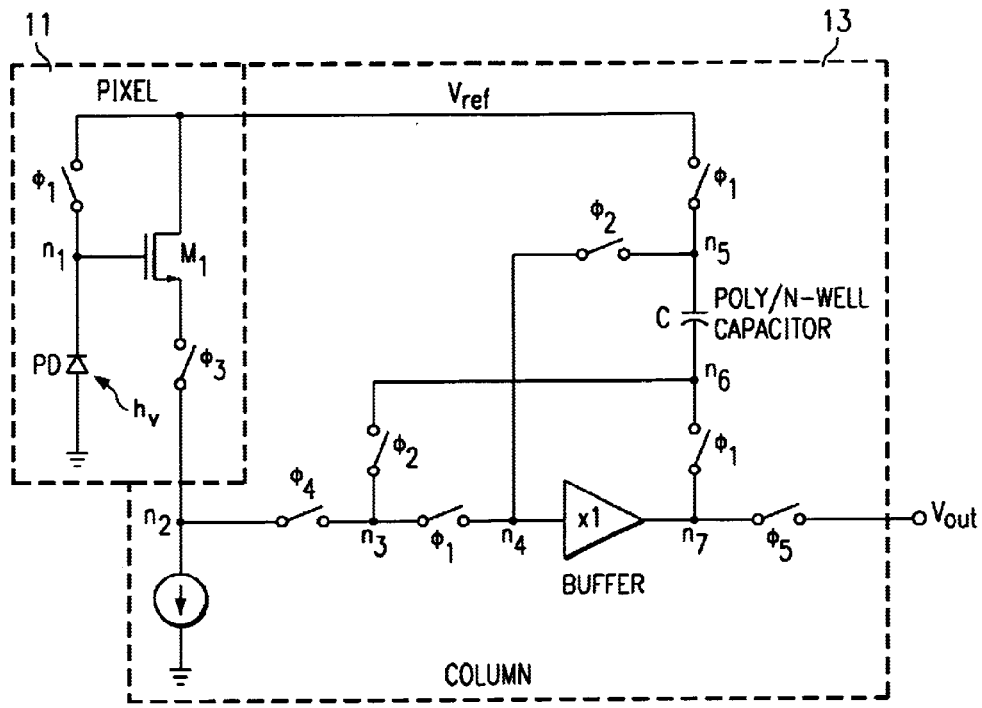
FIG. 1 illustrates pertinent portions of exemplary embodiments of an imaging sensor according to the invention.

FIG. 1 illustrates pertinent portions of exemplary embodiments of a CMOS imaging sensor according to the invention. The imaging sensor of FIG. 1 includes a pixel circuit 11 and a column read-out circuit 13. The imaging sensor of FIG. 1 includes a plurality of circuit nodes designated as n1, n2, n3, n4, n5, n6 and n7. The column read-out circuit 13 includes a poly/n-well capacitor C coupled between nodes n5 and n6, and a buffer coupled between nodes n4 and n7. The pixel circuit 11 includes a photodiode PD as is conventionally used in CMOS imaging sensors.

The imaging sensor of FIG. 1 further includes a switching arrangement including a plurality of switches for selectively interconnecting various nodes in the imaging sensor. Each switch of the switching arrangement is controlled by one of a plurality of control signals designated in FIG. 1 as Φ1, Φ2, Φ3, Φ4 and Φ5. These control signals are also illustrated in the timing diagram of FIG. 2. The timing diagram of FIG. 2, taken in conjunction with FIGS. 1, 3 and 4, illustrates an example of the control and operation of the imaging sensor of FIG. 1.

Figure 2:
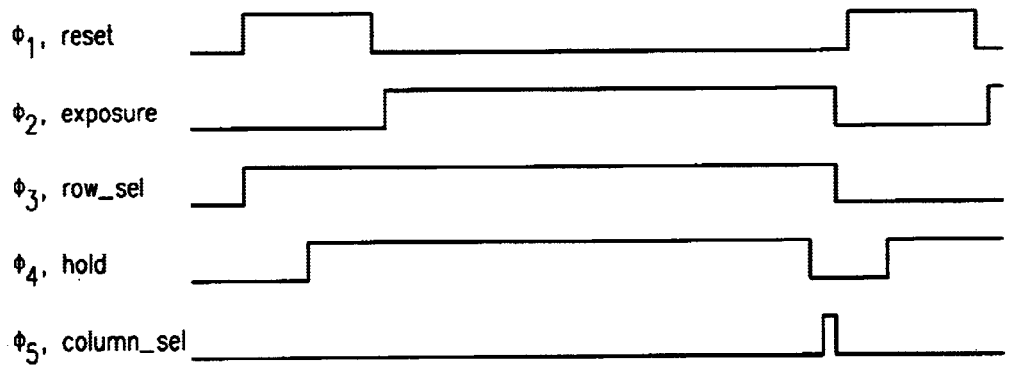
FIG. 2 is a timing diagram which illustrates an example of the control and operation of the imaging sensor of FIG. 1.
Figure 3:
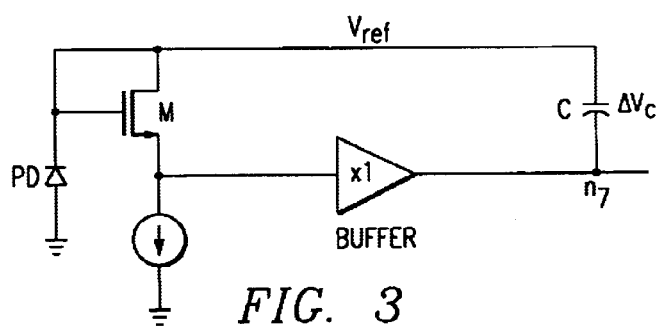
FIG. 3 illustrates a reset state of the imaging sensor of FIG. 1.
Figure 4:
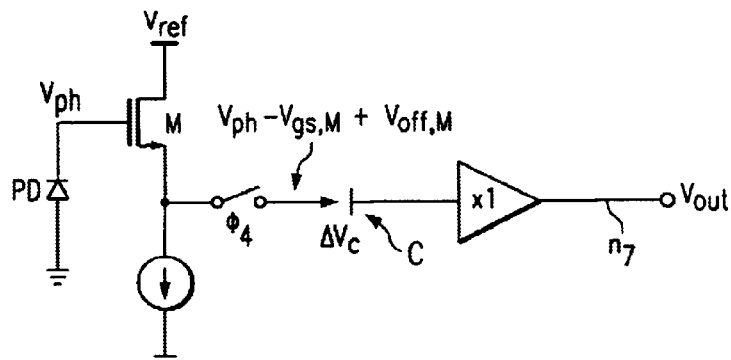
FIG. 4 illustrates a read-out state of the imaging sensor of FIG. 1.

Referring now to FIGS. 1–3, when Φ1 (reset), Φ3 (row select) and Φ4 (hold) are high in FIG. 2, the corresponding switches in FIG. 1 are closed, and the remaining switches controlled by Φ2 and Φ5 are open. Thus, at this time, the imaging sensor of FIG. 1 has the circuit configuration illustrated in FIG. 3. At this time, the voltage across capacitor C is:

$$\Delta V_c = V_{ref} - (V_{ref} - V_{gs,M} + V_{off,M} + V_{off,buf})$$

where $V_{gs,M}$ represents the gate-source voltage of the NMOS driver M, $V_{off,M}$ represents the DC offset of the driver M, and $V_{off,buf}$ represents the DC offset of the buffer.

When Φ4 (hold) goes low and Φ5 (column select) goes high after exposure, the sensor of FIG. 1 assumes the circuit configuration illustrated in FIG. 4. In this configuration, the output voltage is given by:

$$V_{out} = V_{ph} - V_{gs,M} + V_{off,M} + V_{off,buf} + \Delta V_c$$
$$= V_{ph} - V_{gs,M} + V_{off,M} + V_{off,buf} + V_{ref} -$$
$$(V_{ref} - V_{gs,M} + V_{off,M} + V_{off,buf})$$
$$= V_{ph}$$

where $V_{ph}$ is the voltage across the photodiode PD.

It can be seen from the foregoing that all of the mismatch offsets are stored in the capacitor C during the reset phase, and are then cancelled out in the read-out phase. That is, the operation illustrated in FIGS. 1–4 uses the reset phase, as controlled by Φ1 to store the mismatch information into the capacitor, and the mismatch information is then cancelled out during the read-out phase controlled by Φ4 and Φ5. This means that the operation described above with respect to FIGS. 1–4 can read-out only one row of the image sensor array at one exposure time. Accordingly, in applications that have a particularly long exposure time, the embodiments of FIGS. 1–4 might not be able to read out the whole image sensor array as quickly as desired.

Figure 5:
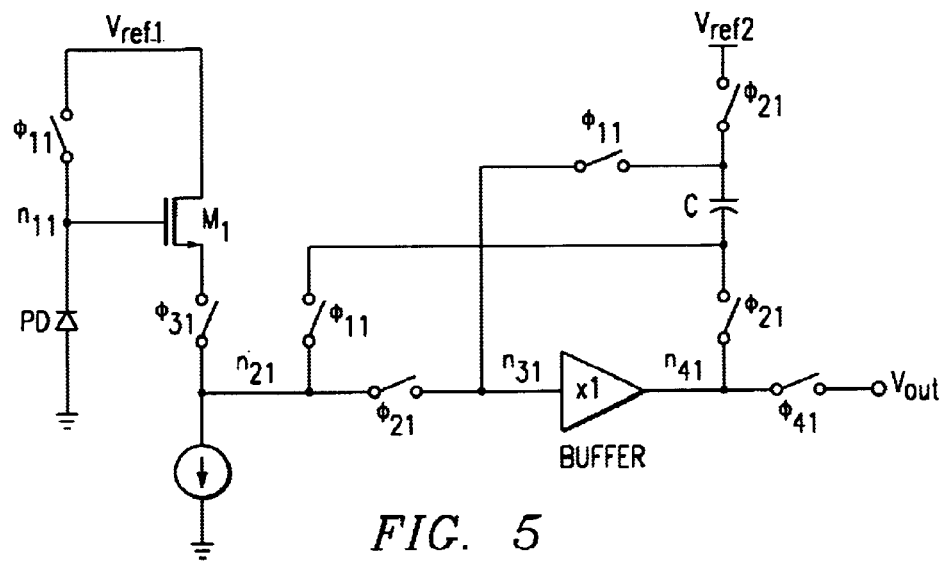
FIG. 5 illustrates pertinent portions of further exemplary embodiments of an imaging sensor according to the invention.

FIG. 5 illustrates pertinent portions of exemplary embodiments of a CMOS imaging sensor according to the invention which can provide faster operation than the imaging sensor of FIG. 1. The image sensor of FIG. 5 includes generally the same circuit elements as FIG. 1, but has a differently designed arrangement of switches for controlling interconnection of the circuit elements. The sensor of FIG. 5 includes nodes n11, n21, n31 and n41, and each of the switches in the FIG. 5 switching arrangement is controlled by one of a plurality of control signals Φ11, Φ21, Φ31 and Φ41. The image sensor of FIG. 5 also utilizes two voltage references, $V_{ref1}$ and $V_{ref2}$, to increase the output signal swing range.

Figure 6:
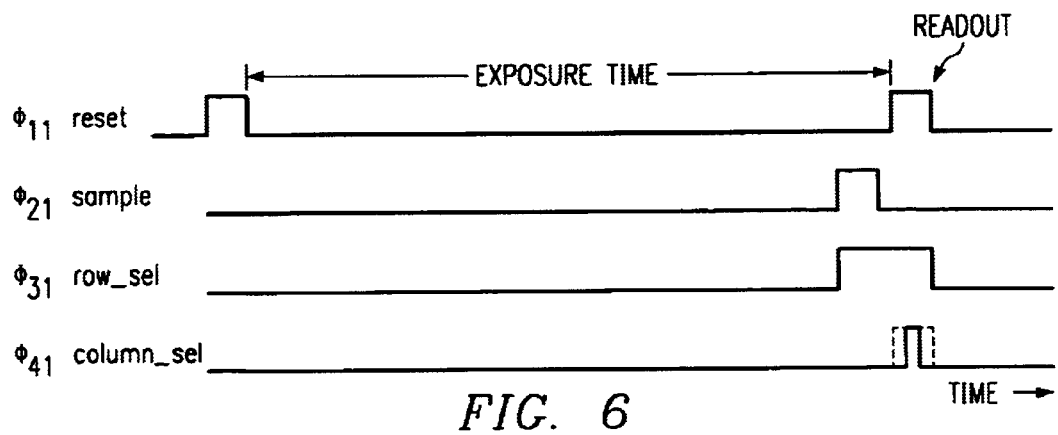
FIG. 6 is a timing diagram which illustrates exemplary signals which can be used to control operations of the imaging sensor of FIG. 5.

FIG. 6 is a timing diagram which illustrates the signals Φ11, Φ21, Φ31 and Φ41 which control the image sensor of FIG. 5. As shown in FIG. 6, the image signal is read-out by operation of Φ41 (column select) during the second pulse of Φ11 (reset).

Referring now to FIGS. 5 and 6, during the sampling phase, when Φ21 (sample) and Φ31 (row select) both go high, the image sensor of FIG. 5 assumes the circuit configuration illustrated by FIG. 7. In FIG. 7, the voltage across capacitor C is given by:

$$\Delta V_c = V_{ref2} - (V_{ph} - V_{gs,M} + V_{off,M} + V_{off,buf})$$

During the read-out phase, with Φ11, Φ31 and Φ41 all high, the image sensor of FIG. 5 assumes the circuit configuration illustrated in FIG. 8. In this configuration, the output voltage is given by:

$$V_{out} = V_{ref1} - V_{gs,M} + V_{off,M} + \Delta V_c + V_{odd,buf}$$
$$= V_{ref1} + V_{ref2} - V_{ph}.$$

Again, the offset mismatch does not appear in the output voltage $V_{out}$, which is read-out during the reset phase. Therefore, different rows of an image sensor array can partly share the exposure time illustrated in FIG. 6.

In view of the foregoing discussion, it will be evident to workers in the art that the imaging sensor embodiments of FIGS. 1–8 are: insensitive to parasitic routing capacitance because the output nodes n7 and n41 are low-impedance nodes; low power sensors because they provide a true column-parallel read-out; leakage and stray insensitive although using a poly/n-well capacitor, because the n-well is connected to a low-impedance node during charge storage. Moreover, and assuming that the capacitors C within a given sensor array are well matched, charge-injection and clock-feedthrough do not present a problem because they are common-mode signals to all pixels of the array.

Although exemplary embodiments of the invention are described above in detail, this does not limit the scope of the invention, which can be practiced in a variety of embodiments.

What is claimed is:

1. An image sensor apparatus, comprising:
   a pixel circuit for sensing image information;
   a readout circuit coupled to said pixel circuit for reading out the image information, said readout circuit including a capacitor and a switching arrangement coupled to said capacitor for switching said capacitor into and out of connection between each of first and second pairs of nodes of said readout circuit, wherein
   said capacitor, when connected between said first pair of nodes, stores charge for reducing noise when reading out the image information, and
   wherein one of said first pair of nodes is a low impedance node.

2. The apparatus of claim 1, wherein said low impedance node is an output of said readout circuit for reading out the image information.

3. An image sensor apparatus, comprising:

a pixel circuit for sensing image information; and a readout circuit coupled to said pixel circuit for reading out the image information, said readout circuit including a capacitor and a switching arrangement coupled to said capacitor for switching said capacitor into and out of connection between each of first and second pairs of nodes of said readout circuit, wherein said capacitor, when connected between said first pair of nodes, is for reading out the image information, said capacitor, when connected between said second pair of nodes, stores charge for reducing noise when reading out the image information, and one of said second pair of nodes is a low impedance node.

4. The apparatus of claim 3, wherein said low impedance node is an output of said readout circuit for reading out the image information.

5. An image sensor apparatus, comprising:

a pixel circuit for sensing image information;

a readout circuit coupled to said pixel circuit for reading out the image information, said readout circuit including a capacitor and a switching arrangement coupled to said capacitor for switching said capacitor into and out of connection between each of first and second pairs of nodes of said readout circuit, wherein one of said nodes is a low impedance node that serves as an output of said readout circuit.

6. An image sensor apparatus, comprising:

a pixel circuit for sensing image information; and a readout circuit coupled to said pixel circuit for reading out the image information, said readout circuit including a capacitor and a switching arrangement coupled to said capacitor for switching said capacitor into and out of connection between each of first and second pairs of nodes of said readout circuit, wherein said readout circuit includes a buffer having an input coupled to said switching arrangement for connection to said pixel circuit, said buffer having an output for outputting the image information from said readout circuit and said buffer output is one of said nodes of said first pair and said buffer input is one of said nodes of said second pair.

7. An image sensor apparatus, comprising:

a pixel circuit for sensing image information;

a readout circuit coupled to said pixel circuit for reading out the image information, said readout circuit including a capacitor and a switching arrangement coupled to said capacitor for switching said capacitor into and out of connection between each of first and second pairs of nodes of said readout circuit, wherein one of said nodes is a reference voltage node and another of said nodes is a low impedance node.

8. A method of controlling an image sensor apparatus including a pixel circuit for sensing image information and a readout circuit coupled to the pixel circuit for reading out the image information, comprising the steps of:

switching a capacitor into and out of connection between a first pair of nodes of the readout circuit; and switching the capacitor into and out of connection between a second pair of nodes of the readout circuit, wherein one of said switching steps includes switching said capacitor into connection between a low impedance node and a further node.

9. The method of claim 8, including the step of using said low impedance node as an output node for reading out the image information from the readout circuit.

10. A method of controlling an image sensor apparatus including (1) a plurality of pixel circuits, each having a photodiode and supplied with power having a first supply voltage, for sensing image information and providing as an output in a readout period a sense voltage representative of the sensed image information, and (2) a readout circuit supplied with power having a second supply voltage, and including a buffer having an input and an output, coupled to receive at an input in sequential readout periods the outputs of the pixel circuits and provide as an output a sequence of pixel voltages corresponding to the sequence of outputs of the pixel circuits, comprising, in each readout period, the steps of:

switching a capacitor into a first configuration having connection between the second supply voltage and the output of the buffer; and then switching the capacitor into a second configuration having connection between the output of a pixel circuit and the input of the buffer, such that the capacitor, when the capacitor is in the first configuration a compensating voltage is stored therein including voltage components incidental to the readout of the pixel voltage, and when the capacitor is in the second configuration the incidental voltage components are canceled.

11. A method according to claim 10, wherein the pixel circuit comprises a MOS transistor having a source, a gate and a drain, the source being connected by way of a first switch to the input of the readout circuit, the drain being connected to the first supply voltage and the gate being connected to the common connection node of first terminals of a second switch and the photodiode, the other terminal of the second switch being connected to the first reference voltage and the other terminal of the photodiode being connected to ground.

* * * * *